US012753845B2

(12) United States Patent
Nadji

(10) Patent No.: US 12,753,845 B2
(45) Date of Patent: Oct. 6, 2026

(54) VALVE

(71) Applicant: Frese A/S, Slagelse (DK)

(72) Inventor: David Nadji, Greve (DK)

(73) Assignee: Vexve A/S, Slagelse (DK)

( * ) Notice: Subject to any disclaimer, the term of this patent is extended or adjusted under 35 U.S.C. 154(b) by 0 days.

(21) Appl. No.: 18/721,753

(22) PCT Filed: Sep. 30, 2022

(86) PCT No.: PCT/DK2022/050200
§ 371 (c)(1),
(2) Date: Jun. 19, 2024

(87) PCT Pub. No.: WO2023/116997
PCT Pub. Date: Jun. 29, 2023

(65) Prior Publication Data

US 2025/0052329 A1 Feb. 13, 2025

(30) Foreign Application Priority Data

Dec. 21, 2021 (DK) ............................ PA202170645

(51) Int. Cl.
*F16K 11/076* (2006.01)
*F16K 5/06* (2006.01)

(52) U.S. Cl.
CPC .......... *F16K 11/076* (2013.01); *F16K 5/0684* (2013.01)

(58) Field of Classification Search
CPC ...... F16K 11/076; F16K 5/0478; F16K 5/188; F16K 11/085; F16K 5/0278;
(Continued)

(56) References Cited

U.S. PATENT DOCUMENTS 1,166,571 A 1/1916 Bard
3,379,408 A 4/1968 Lowrey
(Continued)

FOREIGN PATENT DOCUMENTS

CN 104006179 A 8/2014
DE 1943985 A1 1/1971
(Continued)

OTHER PUBLICATIONS

International Search Report and Written Opinion, dated Dec. 12, 2022, 11 pages, issued in PCT Application No. PCT/DK2022/050200.
(Continued)

*Primary Examiner* — Michael R Reid
(74) *Attorney, Agent, or Firm* — AVEK IP, LLC

(57) ABSTRACT

A valve comprises a valve housing with a valve chamber having an internal chamber wall. A plurality of ports are opening into the valve chamber and a valve body is movable to optionally seal one ports. An endless resilient sealing member situated in a sealing member groove is sealing between the valve body and the internal chamber wall. The sealing member groove has a cross-section defining a cavity and an opening. The sealing member is situated in the cavity, the opening is more narrow than a cross-sectional dimension of the sealing member, and at least one channel is provided connecting the cavity of the sealing member groove and surroundings of the valve body.

11 Claims, 5 Drawing Sheets

(58) Field of Classification Search
CPC ............... F16K 5/0684; F16K 11/0853; F16K 11/0856; F16K 5/168; F16K 5/205
See application file for complete search history.

(56) References Cited

U.S. PATENT DOCUMENTS

| | | | | |
|---|---|---|---|---|
| 3,437,310 | A | 4/1969 | Inch | |
| 3,612,483 | A | 10/1971 | Pool | |
| 3,938,553 | A | 2/1976 | Ortega | |
| 4,410,007 | A | 10/1983 | Karpenko | |
| 4,470,429 | A | 9/1984 | Johnson | |
| 5,037,067 | A * | 8/1991 | Ray | F16K 5/0478 251/900 |
| 6,497,250 | B1 * | 12/2002 | Johann | F16K 11/0853 137/625.46 |
| 2004/0045613 | A1 * | 3/2004 | Hinojosa, Jr. | A61H 33/60 137/625.47 |

FOREIGN PATENT DOCUMENTS

| | | | |
|---|---|---|---|
| DE | 2055467 | A1 | 5/1972 |
| EP | 0398406 | A1 | 11/1990 |
| KR | 20180023619 | A | 3/2018 |

OTHER PUBLICATIONS

Danish Search Report, dated May 12, 2022, 4 pages, issued in DK Application No. PA202170645.

* cited by examiner

VALVE

CROSS-REFERENCE TO RELATED APPLICATIONS

This application is the national phase of, and claims priority to, International Application No. PCT/DK2022/050200, filed 30 Sep. 2022, which claims priority to Danish Patent Application No. PA 2021 70645, filed 21 Dec. 2021.

FIELD OF THE INVENTION

The disclosure relates to a valve.

SUMMARY

According to one embodiment of the invention, a valve comprises a valve housing with a valve chamber having an internal chamber wall. A plurality of ports are opening into the valve chamber and a valve body is movable to optionally seal one ports. An endless resilient sealing member situated in a sealing member groove is sealing between the valve body and the internal chamber wall. The sealing member groove has a cross-section defining a cavity and an opening. The sealing member is situated in the cavity, the opening is more narrow than a cross-sectional dimension of the sealing member, and at least one channel is provided connecting the cavity of the sealing member groove and surroundings of the valve body.

WRITTEN DESCRIPTION

Figure 1:
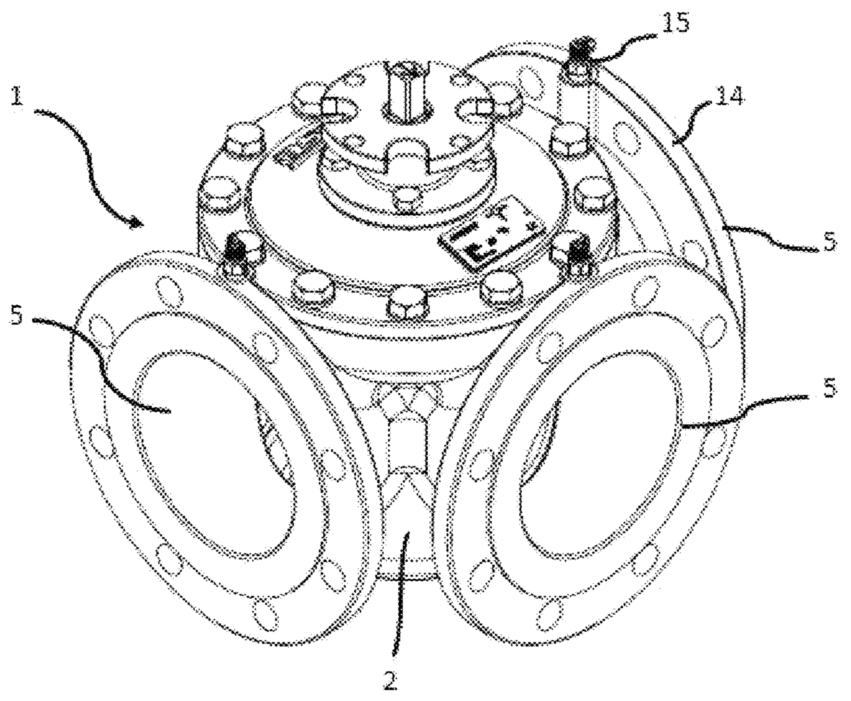
FIG. 1 is an isometric view of a valve according to embodiments of the invention.
Figure 2:
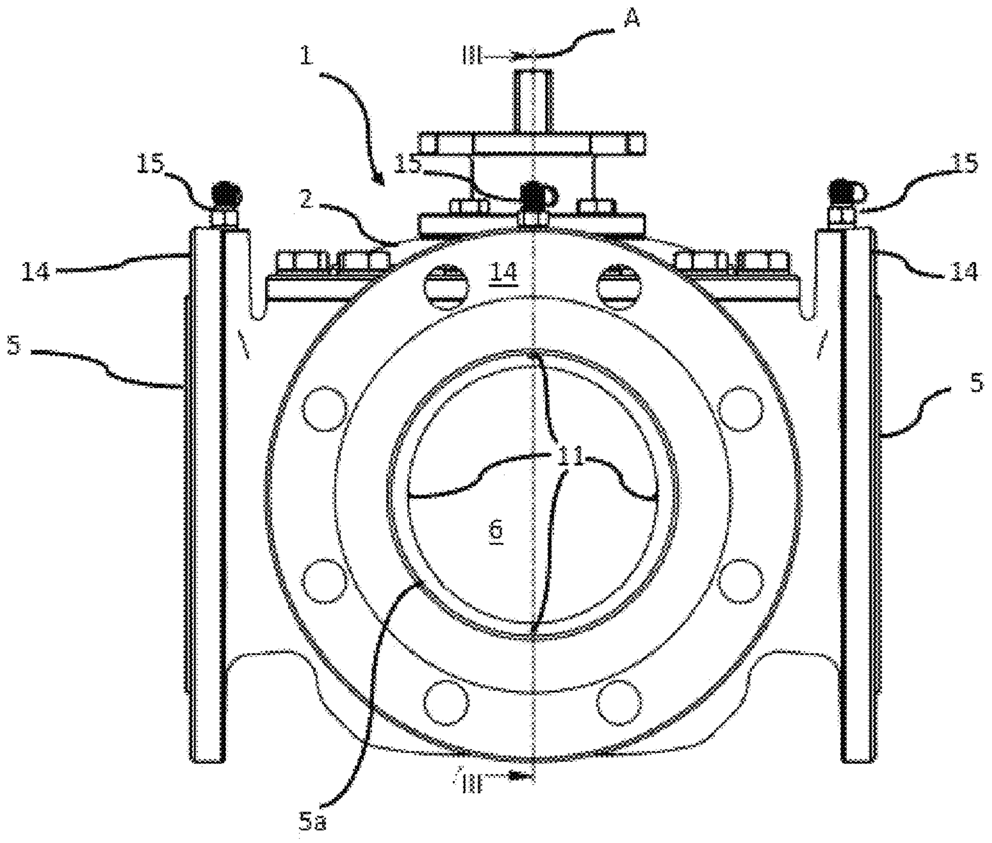
FIG. 2 is a front view of the valve of FIG. 1.

The disclosure relates to a valve having a valve housing with a valve chamber. The valve chamber has an internal chamber wall. A plurality of ports open into the valve chamber. A valve body is movable for optionally sealing one of the plurality of ports relative to the valve chamber. And an endless resilient sealing member is situated in a sealing member groove for sealing between the valve body and the internal chamber wall.

A valve of this kind may e.g. be a three-way valve used for either diverting a flow entering one port into two flows exiting the two remainder ports whereby the mutual proportions of the flows exiting said two ports may be adjusted by adjusting the rotational position of the valve body possibly to an extent where one or the other of said two ports is sealed and the flow through that port is zero. Another possibility is to mix two flows entering the three-way valve through respective two of the three ports for the mixed flow to exit the three-way valve through the third port. Again, it is possible to adjust the mutual proportion of the two entering flows in the mixture by adjusting the rotational position of the valve body to restrict more or less one or the other of the two ports possibly to an extent where one or the other of the two ports is sealed and the flow through said port is zero.

A problem relating to such valves is that sealing a port may not be complete, especially after some time of operation when the sealing member is worn. Thus, an intended sealed port may be leaking which, depending on the character of the system in which the valve is incorporated, may cause problems such as loss of energy or efficiency, e.g., when such a valve is used in a marine vessel such as a ship, such as in a cooling water system, problems may arise such as increased pump energy consumption, reduced freshwater production, and even increasing main engine fuel consumption. It is an object of the invention to offer a solution to the above-mentioned problem of leaking valves.

This is obtained by a valve of the above kind which is characterized in that the sealing member groove has a cross-section defining a cavity and an opening, the sealing member being situated in the cavity, the opening being more narrow than a cross-sectional dimension of the sealing member, and that at least one channel is provided connecting the cavity of the sealing member groove and surroundings of the valve body. By placing the sealing member in a groove with an opening which is narrower than the cross-sectional dimension of the sealing member the sealing member is caught in the groove and through the channel fluid may enter the groove from the surroundings of the valve body to urge the sealing member towards the opening of the groove at or by the pressure of said surroundings whereby the sealing member may bulge through the opening of the groove while possibly closing said opening due to the larger cross-sectional dimension and the resilience of the sealing member. Alternatively or additionally, the pressure entering through the channels may act on the sealing member between a bottom wall of the groove and the internal chamber wall. Thereby the sealing member may be forced against the wall opposing the groove to seal between the internal chamber wall and the valve body even when the sealing member is worn. Thus, leakage from a sealed port may be minimized and substantially avoided.

U.S. Pat. No. 5,037,067 A discloses a valve comprising a valve housing with a valve chamber having an internal chamber wall; a plurality of ports opening into the valve chamber; a valve body rotatable for optionally sealing one of the plurality of ports relative to the valve chamber; and an O-ring situated in a sealing member groove for sealing between the valve body and the internal chamber wall. The groove has an inner wall; an outer wall parallel therewith; and a bottom wall. The inner wall comprises recesses that are interconnected by channels to allow the O-ring to displace towards the recesses when subject to a pressure difference, thereby preventing the O-ring from being damaged or clipped upon passage across an edge of a port in the valve housing when the valve is operated to open one port and close another port. The sealing member groove of this prior art valve has an oval shape and extends over approx. 140° around an axis of rotation of the valve body and accordingly the O-ring is securely held in the sealing member groove once seated. In use, the sealed port is pressureless.

In an embodiment the valve body is rotatable around an axis of rotation.

In an embodiment the sealing member groove comprises a bottom wall.

In an embodiment the sealing member (7) is sealing between the bottom wall and the internal chamber wall.

In an embodiment, in use, fluid may enter the groove through the channel from the surroundings of the valve body to urge the sealing member towards the opening of the groove at or by the pressure of said surroundings.

In an embodiment, the sealing member closes the opening of the groove.

In an embodiment, the sealing member may bulge through the opening of the groove while closing said opening.

In a practical embodiment, the valve body has a sealing surface adapted to be positioned adjacent a portion of the internal chamber wall surrounding one of the plurality of ports when the valve body is in a rotational position to seal said one of the plurality of ports, whereby the sealing member groove is encircling said one of the plurality of ports for the sealing member to seal between the sealing surface of the valve body and the internal chamber wall.

In an embodiment, the at least one channel is configured for flow/pressure-connecting the cavity of the sealing member groove with one of the plurality ports, when the valve body is in a rotational position to seal said one of the plurality of ports.

Relating to the term "flow/pressure-connecting" it should be understood that in general the channel connects the groove with surroundings of the valve body, e.g., at a port being sealed, whereby fluid may penetrate into the sealing member groove, but as the sealing member closes the opening of the groove the fluid cannot flow from the groove and thus fluid cannot flow through the channel into the groove because the fluid could not flow further, but the pressure of the fluid in the surroundings, e.g., in the port being sealed, may be transferred to and be present in the groove opposite the sealing member relative to the opening thus providing a back-pressure urging the sealing member towards the opening of the groove.

In an embodiment, the internal chamber wall comprises a cylindrical section coaxial with the axis of rotation, at least one of the plurality of ports opening into the valve chamber through said cylindrical section. The cylindrical shape of the internal chamber wall facilitates production of the valve and further facilitates production at fine tolerances.

In a further embodiment, the sealing surface of the valve body is part of a cylindrical surface coaxial with the axis of rotation.

In an embodiment, the valve comprises a plurality of said channels.

In a practical embodiment, the sealing member is an O-ring. It should be noted that O-rings are commonly known in the art. Thus, an O-ring, also known as a packing or a toric joint, is a mechanical gasket in the shape of a torus; it is a loop of elastomer with a round cross-section.

In an embodiment, the cavity of the sealing member groove has a cross-sectional dimension in a direction parallel to the cross-sectional dimension of the opening, which is larger than the cross-sectional dimension of the opening.

In a practical embodiment, the sealing member groove has a dovetail-like cross-section wherein the opening constitutes a narrow part of the dovetail-like cross-section.

In a practical embodiment, the valve is a three-way valve comprising three ports.

In an embodiment, the valve housing and the valve body comprise seawater resistant metal. It should be understood that the term "metal" may comprise steel as well as non-steel metals, e.g. aluminium bronze.

The disclosure also relates to use of a valve whereby fluid pressure enters the groove through the channel from the surroundings of the valve body to urge the sealing member towards the opening of the groove at or by the pressure of said surroundings.

The disclosure also relates to a liquid system, especially a water system, and further especially a cooling water system comprising a valve as described herein.

The disclosure also relates to a marine vessel comprising a valve as described herein.

The disclosure also relates to a marine vessel comprising a liquid system, especially a water system, and further especially a cooling water system, said system comprising a valve as described herein.

In the following, the invention will be explained in more detail by means of an example of an embodiment having reference to the schematic drawings.

Figure 3:
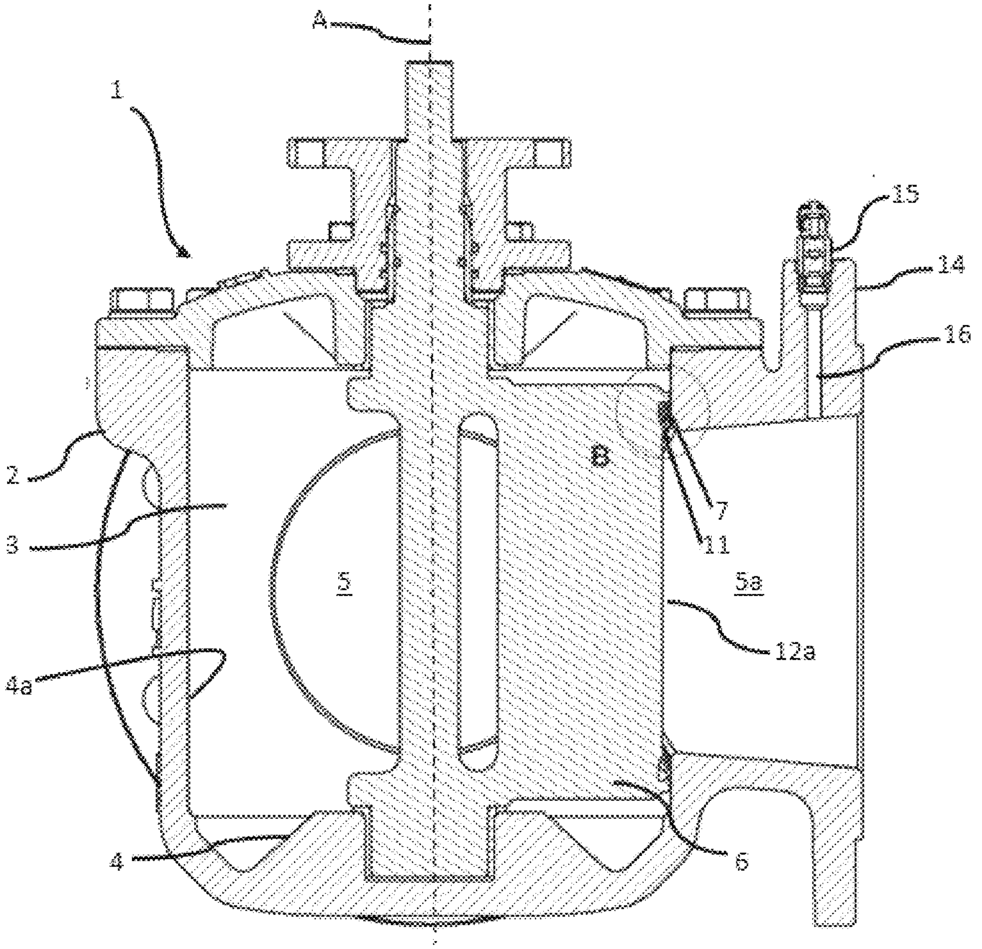
FIG. 3 is a section as indicated by line III-III in FIG. 2.
Figure 4:
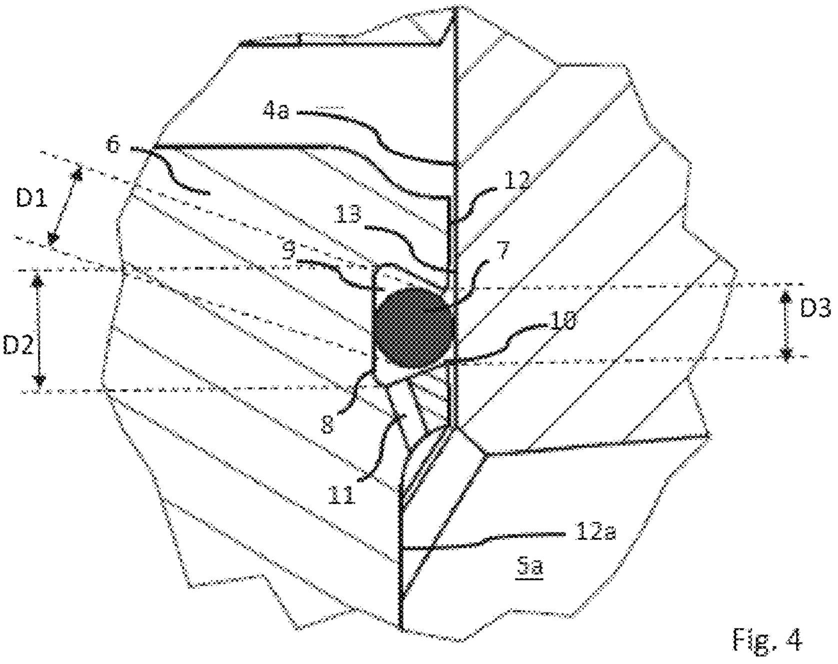
FIG. 4 is an enlarged detail indicated by circle B in FIG. 3.

FIGS. 1 to 4 show a valve 1 comprising a valve housing 2 with a valve chamber 3. The valve chamber 3 has an internal chamber wall 4 and a plurality of ports 5 that open into the valve chamber 3. A valve body 6 is provided in the valve chamber 3 to be rotatable around an axis of rotation A for optionally sealing one 5*a* of the plurality of ports 5 relative to the valve chamber 3. An endless resilient sealing member 7, preferably in the form of an O-ring, see FIGS. 3 and 4, is situated in a sealing member groove 8 for sealing between the rotatable valve body 6 and the internal chamber wall 4.

According to the disclosure the sealing member groove 8 has a cross-section defining a cavity 9; an opening 10; and a bottom wall 8*c* (see FIGS. 4*a* and 4*b*) opposite the opening 10; and an outer wall 8*a* and an inner wall 8*b* extending obliquely and mutually diverging from either side of the opening 10 towards the bottom wall 8*c*. The sealing member 7 is situated in the cavity 9. The opening 10 has a cross-sectional dimension $D_3$ that is more narrow than a cross-sectional dimension $D_1$ of the sealing member 7, and at least one channel 11, in the embodiment shown, four channels 11, is provided to connect the cavity 9 of the sealing member groove 8 and surroundings of the rotatable valve body 6.

In embodiments, the rotatable valve body 6 has a sealing surface 12 adapted to be positioned adjacent a portion 13 of the internal chamber wall 4, said portion 13 surrounding one 5*a* of the plurality of ports 5, when the rotatable valve body 6 is in a rotational position to seal said one 5*a* of the plurality of ports. The sealing member groove 8 is encircling said one 5*a* of the plurality of ports for the sealing member 7 to seal between the sealing surface 12 of the valve body 6 and the internal chamber wall 4.

In embodiments, the sealing member groove 8 is located in valve body 6 to open into the sealing surface 12 of the valve body. The channels 11 are extending from the cavity 9 to open into a shallow, recessed portion 12*a* of the sealing surface 12 thereby connecting the cavity 9 with the surroundings of the rotatable valve body 6.

In the embodiment shown, the channel(s) 11 are configured for flow/pressure-connecting the cavity 9 of the sealing member groove 8 with said one 5*a* of the plurality ports, when the rotatable valve body 6 is in a rotational position to seal said one 5*a* of the plurality of ports.

In the embodiment shown, the internal chamber wall 4 comprises a cylindrical section 4*a* coaxial with the axis of rotation A, at least one of the plurality of ports 5 (in the illustrated embodiment all three ports) is opening into the valve chamber 3 through said cylindrical section 4*a*.

The cylindrical section 4*a* cooperates in the illustrated embodiment with the sealing surface 12 of the rotatable valve body 6, said sealing surface being part of another cylindrical surface coaxial with the axis of rotation A.

In the embodiment shown, the cavity 9 of the sealing member groove 8 has a cross-sectional dimension $D_2$ in a direction parallel to the cross-sectional dimension $D_3$ of the opening, which is larger than the cross-sectional dimension of the opening $D_3$. Thus, the sealing member groove 8 has a dovetail-like cross-section wherein the opening 10 constitutes a narrow part of the dovetail-like cross-section.

The dovetail-like cross-section of the sealing member groove 8 is defined by the opening 10; the opposing bottom wall 8*c*; and the outer wall 8*a* and the inner wall 8*b* extending obliquely and mutually diverging from either side of the opening 10 towards the bottom wall 8*c*, the latter extending substantially parallel to the opposing cylindrical section 4*a*.

Each port 5 is, in a manner known per se, provided with a flange 14 for connection with a component of a system, such as a tube. Further, in the embodiment shown, each port 5 is provided with a so-called PT-plug 15 for measurement of pressure and/or temperature. Thus, the PT-plug is a tubular body containing one or more, e.g. two elastomer bodies through which a cannula may be inserted to penetrate into a bore 16 extending into the port 5 for measurement of pressure or temperature of a fluid in the port 5.

Embodied as a 3-way valve, the valve 1 may, e.g., be used for diverting a flow into two flows, or for mixing two flows into one flow.

FIGS. 5*a*-5*c*, 6*a*-6*c*, 7*a*-7*c*, and 8*a*-8*c* illustrate different uses of the valve 1. The ports of the valve 1 are designated A, B, and C, respectively, whereby C designates the port through which a flow to be diverted is entering the valve 1, or a mixed flow is exiting the valve 1. Correspondingly, A and B designate ports through which one of two branches of a diverted flow is exiting the valve 1, or through which one of two flows to be mixed are entering the valve 1.

Figure 5A:
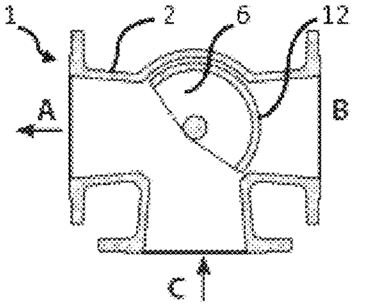
FIG. 5*a*-5*c* illustrates diverting a flow by means of a 3-way valve in a first configuration.
Figure 5B:
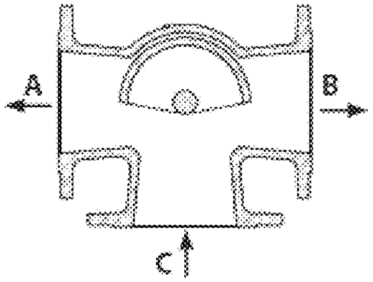
Figure 5C:
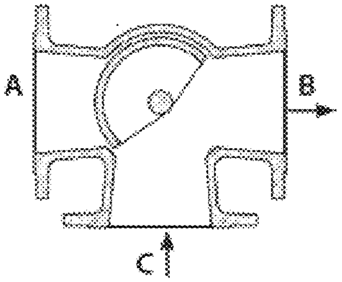

FIGS. 5*a*-5*c* illustrates diverting a flow, whereby FIG. 5*b* shows a condition of regulating whereby the mutual rates of flow through ports A and B are adjusted by the position of the valve body 6. FIGS. 5*a* and 5*c*, respectively show port B and port A sealed whereby the entire flow entering through port C is exiting through port A or B, respectively.

Figure 6A:
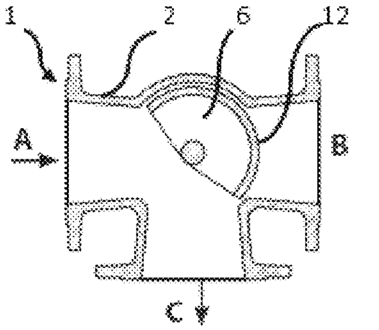
FIG. 6*a*-6*c* illustrates mixing two flows by means of a 3-way valve in the first configuration.
Figure 6B:
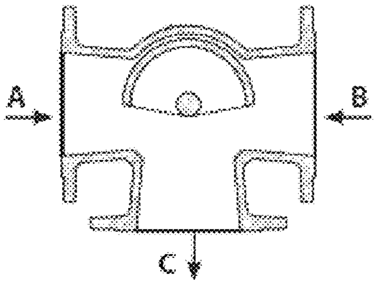
Figure 6C:
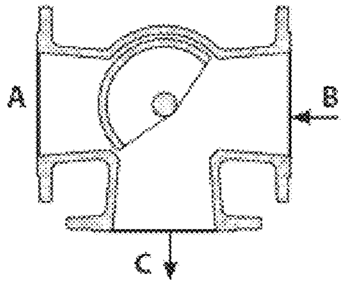

It should be noted that in the embodiments illustrated in FIGS. 5*a*-5*c* and in FIGS. 6*a*-6*c*, the sealing surface 12 spans an angle of approx. 180° around the axis of rotation whereby the valve body only need to be turned approx. 90° to be rotated from the position of FIG. 5*a* or 6*a*, through the position of FIG. 5*b* or 6*b* to the position of FIG. 5*c* or 6*c* in order to change from sealing port B into sealing port A, or vice versa.

FIGS. 6*a*-6*c* illustrate mixing two flows, whereby FIG. 6*b* shows a condition of regulating whereby the mutual rates of flow through ports A and B are adjusted by the position of the valve body 6. FIGS. 6*a* and 6*c*, respectively show port B and port A sealed whereby the entire flow exiting through port C is entering through port A or B, respectively.

Figure 7A:
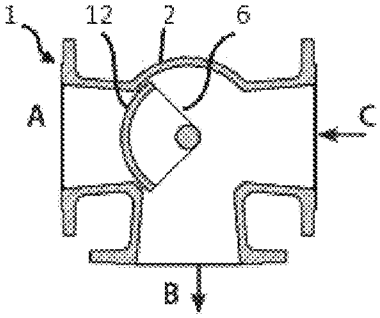
FIG. 7*a*-7*c* illustrates diverting a flow by means of a 3-way valve in a second configuration.
Figure 7B:
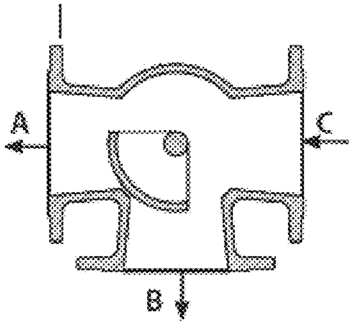
Figure 7C:
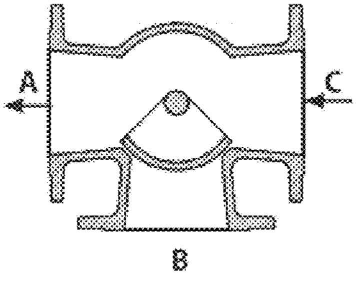

FIGS. 7*a*-7*c* again illustrate diverting a flow, whereby FIG. 7*b* shows a condition of regulating whereby the mutual rates of flow through ports A and B are adjusted by the position of the valve body 6. FIGS. 7*a* and 7*c*, respectively show port B and port A sealed whereby the entire flow entering through port C is exiting through port A or B, respectively.

It should be noted the valve 1 is configured as a T with one branch constituting the stem or middle branch of the T and the two other branches constituting the arms of the T. In FIGS. 5*a*-5*c* and 6*a*-6*c* the port C is constituting the stem of the T and in FIGS. 7*a*-7*c* and 8*a*-8*c* the port C is constituting the right arm of the T as seen in the figures. The skilled artisan will envisage how the port C might be constituting the left arm of the T.

Figure 8A:
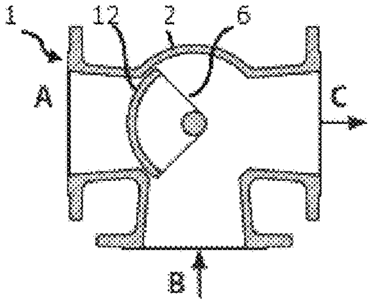
FIG. 8*a*-8*c* illustrates mixing two flows by means of a 3-way valve in the second configuration.
Figure 8B:
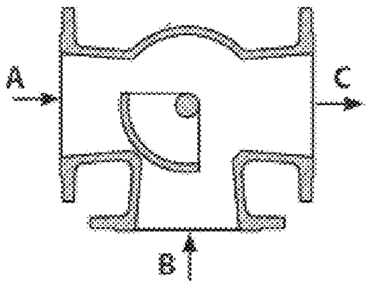
Figure 8C:
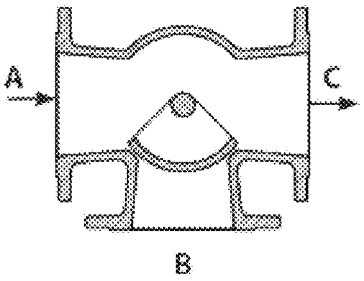

In the embodiments illustrated in FIGS. 7*a*-7*c* and in FIGS. 8*a*-8*c*, the sealing surface 12 spans an angle of approx. 90° around the axis of rotation to be able to cover and seal the port A or the port B, thereby the valve body need to be turned approx. 90° to be rotated from the position of FIG. 7*a* or 8*a*, through the position of FIG. 7*b* or 8*b* to the position of FIG. 7*c* or 8*c* in order to change from sealing port A into sealing port B, or vice versa.

FIGS. 8*a*-8*c* illustrate mixing two flows, whereby FIG. 8*b* shows a condition of regulating whereby the mutual rates of flow through ports A and B are adjusted by the position of the valve body 6. FIGS. 8*a* and 8*c*, respectively show port A and port B sealed whereby the entire flow exiting through port C is entering through port B or A, respectively.

Figure 4A:
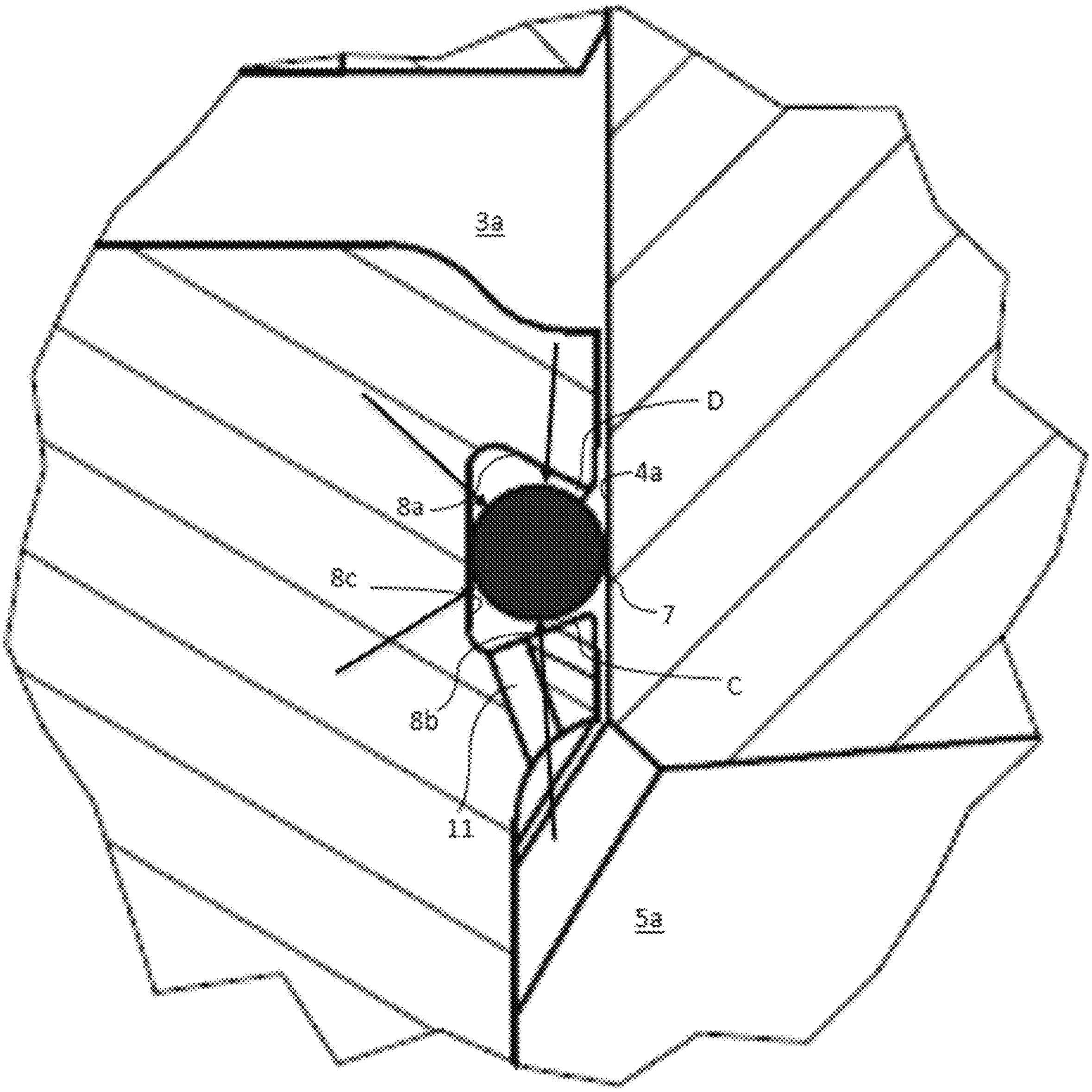
FIG. 4*a* is an enlarged figure similar to FIG. 4 illustrating a way of function of the valve.

By placing the sealing member 7 in the groove 8 which has the opening 10 which is narrower than the cross-sectional dimension $D_1$ of the sealing member 7, the sealing member 7 is caught in the groove 8 and through the channel 11 fluid may enter the groove 8 from the surroundings of the valve body 6, especially from the port 5*a* being sealed, to urge the sealing member 7 towards the opening 10 of the groove 8 at or by the pressure of said surroundings, i.e., in the illustrated embodiment, the port 5*a* being sealed, whereby the sealing member 7 may bulge through the opening 10 of the groove 8 while possibly closing said opening 8 due to the larger cross-sectional dimension $D_1$ and the resilience of the sealing member 7. Thereby the sealing member 7 may be forced against the cylindrical section 4*a* of the internal chamber wall 4 opposing the groove 8 to seal between the internal chamber wall 4 and the valve body 6, even when the sealing member 7 is worn. This situation is illustrated in FIG. 4*a* indicating that an over pressure at the port 5*a*, which is being sealed, relative to the pressure in the part of the valve chamber 3*a* on the other side of the sealing member 7, enters the channel 11 to act on an area of the sealing member 7 from position C to position D in clockwise direction, thereby urging the sealing member 7 towards the opposing cylindrical section 4*a* of the internal chamber wall while closing (not shown) the opening 10.

Figure 4B:
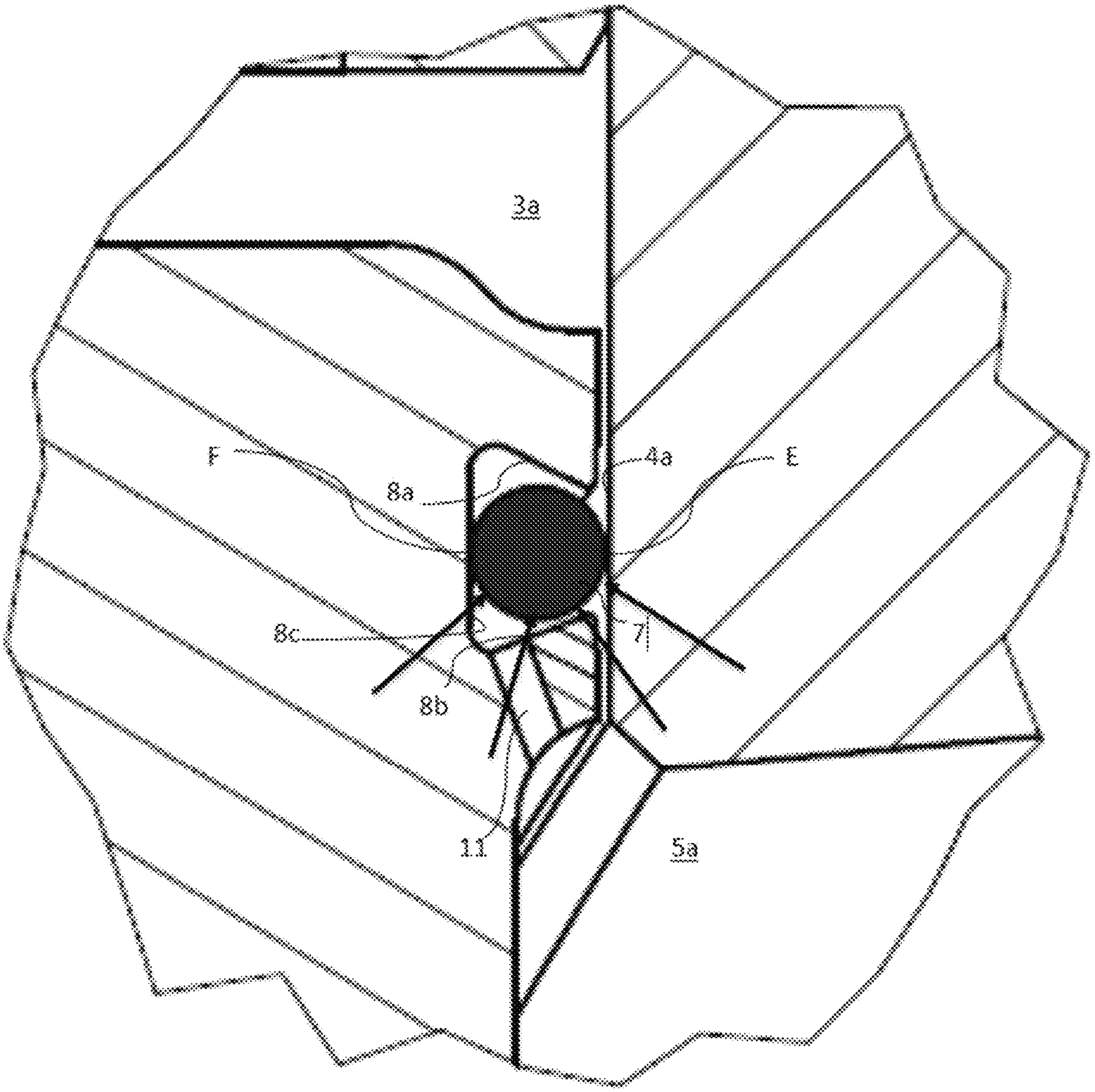
FIG. 4*b* is an additional enlarged figure similar to FIG. 4 illustrating an alternative or additional way of function of the valve.

Additionally or alternatively, the pressure entering through the channels 11 may act on the sealing member 7 between the bottom wall 8*c* and the cylindrical section 4*a*. Thereby the sealing member 7 may be forced against the cylindrical section 4*a* of the internal chamber wall 4 opposing the groove 8 to seal between the internal chamber wall 4 and the valve body 6, even when the sealing member 7 is worn, due to the sealing member 7 being deformed by the pressure entering through the channels 11 whereby the sealing member 7 tends to be compressed in the axial direction of axis A seen in FIG. 3, and to be correspondingly expanded in a direction perpendicular to said axial direction, i.e., in the direction from the bottom wall 8*c* to the cylindrical section 4*a* (or vice versa). This situation is illustrated in FIG. 4*b* indicating that an over pressure at the port 5*a*, which is being sealed, relative to the pressure in the part of the valve chamber 3*a* on the other side of the sealing member 7, enters the channel 11 to act on an area of the sealing member 7 from position E to position F in clockwise direction, thereby urging the sealing member 7 towards the outer wall 8_a_ of the groove 8 to compress (not shown) the sealing member 7 in a direction parallel to the cylindrical section 4_a_ and the bottom wall 8_c_.

Thus, leakage from a sealed port 5_a_ may be minimized and substantially avoided.

Whereas in the above a disclosure has been made with reference to the examples shown in the drawings it should be understood that the invention claimed is not limited to these examples, but the skilled person will be able to provide variants within the scope of the invention as defined in the claims and such variants are within the claimed invention.

The invention claimed is:

1. A three-way valve, comprising:

a valve housing with a valve chamber, said valve chamber having an internal chamber wall;

three ports opening into the valve chamber;

a rotatable valve body rotatable around an axis of rotation for optionally sealing one of the three ports relative to the valve chamber; and an endless resilient sealing member in the form of a torus-shaped O-ring situated in a sealing member groove for sealing between the rotatable valve body and the internal chamber wall;

wherein:

the internal chamber wall comprises a cylindrical section coaxial with the axis of rotation, at least one of the three ports opening into the valve chamber through said cylindrical section of the internal chamber wall;

wherein the valve body has a sealing surface, and the sealing surface of the valve body is part of a cylindrical surface coaxial with the axis of rotation;

wherein the sealing surface of the valve body is adapted to be positioned adjacent a portion of the internal chamber wall surrounding one of the three ports when the valve body is in a rotational position to seal said one of the three ports;

whereby the sealing member groove is encircling said one of the three ports for the sealing member to seal between the sealing surface of the valve body and the internal chamber wall;

wherein the sealing member groove is located in the valve body to open into the sealing surface of the valve body;

the sealing member groove has a cross-section defining a cavity and an opening, the sealing member being situated in the cavity, the opening being more narrow than a cross-sectional dimension of the sealing member;

wherein at least one channel is provided connecting the cavity of the sealing member groove and surroundings of the valve body; and wherein the sealing member groove comprises a bottom wall and two opposing side walls, said bottom wall and two side walls together provide a dovetail-like cross-section of the sealing member groove, the at least one channel opening into the sealing member groove through one of the opposing side walls;

whereby through the channel fluid may enter the groove from the surroundings of the valve body to urge the sealing member towards the opening of the groove by the pressure of said surroundings.

2. The valve according to claim 1, wherein the sealing member is sealing between the bottom wall and the internal chamber wall.

3. The valve according to claim 1, wherein the sealing member closes the opening of the groove.

4. The valve according to claim 1, whereby the sealing member may bulge through the opening of the groove while closing said opening.

5. The valve according to claim 1, wherein the at least one channel is configured for flow/pressure-connecting the cavity of the sealing member groove with one of the plurality ports, when the valve body is in a rotational position to seal said one of the plurality of ports.

6. The valve according to claim 1, wherein the cavity of the sealing member groove has a cross-sectional dimension in a direction parallel to a cross-sectional dimension of the opening, which is larger than the cross-sectional dimension of the opening.

7. The valve according to claim 1, wherein the opening constitutes a narrow part of the dovetail-like cross-section.

8. The valve according to claim 1, wherein the valve body spans an angle in the range from approx. 75° to 200°.

9. The valve according to claim 1, wherein the valve housing and the valve body comprise seawater resistant metal.

10. A liquid system comprising a valve according to claim 1.

11. A marine vessel comprising a valve according to claim 1.

* * * * *